United States Patent [19]

Martin

[11] Patent Number: 5,220,404
[45] Date of Patent: Jun. 15, 1993

[54] INTERNAL ANODE SYSTEM FOR RING LASER GYROSCOPES

[76] Inventor: Graham J. Martin, Litton Systems Inc., Guidance & Control Division, Mail Stop 12, 5500 Canoga Ave., Woodland Hills, Calif. 91367

[21] Appl. No.: 808,333

[22] Filed: Dec. 16, 1991

[51] Int. Cl.⁵ .............. G01C 19/66; H01S 3/083
[52] U.S. Cl. ...................... 356/350; 372/87; 372/94
[58] Field of Search .............. 356/350; 372/87, 88, 372/94

[56] References Cited

U.S. PATENT DOCUMENTS

| | | | |
|---|---|---|---|
| 3,390,606 | 7/1968 | Podgorski | 356/350 |
| 3,469,922 | 9/1969 | Coccoli | 356/350 |
| 3,719,900 | 3/1973 | Hochuli | 372/87 |
| 4,273,282 | 6/1981 | Norvell | 228/173 |
| 4,392,229 | 7/1983 | Hostetler | 356/350 |
| 4,432,660 | 2/1984 | Matthews | 356/350 |
| 4,666,302 | 5/1987 | Rodloff et al. | 356/350 |
| 4,837,774 | 6/1989 | Jabr | 356/350 |
| 4,973,161 | 11/1990 | Simms | 356/350 |

FOREIGN PATENT DOCUMENTS 128230 12/1984 European Pat. Off. ............ 356/350

*Primary Examiner*—Vincent P. McGraw
*Attorney, Agent, or Firm*—L. David Rish; Gerald L. Cline; M. Michael Carpenter

[57] ABSTRACT

Disclosed herein is an Internal Anode System for Ring Laser Gyroscopes comprising at least one internal anode electrically connected, through an active gaseous medium, with a cathode to form a compact and shortened DC discharge pathway for a ring laser gyroscope. The internal anode comprises a conductive coating covering a taped end of the intersection of at least two passageways within a monolithic ring laser. The coated taped end of said passageways communicates with an external power source through an electrical feedthrough placed under and around a dielectric mirror substrate and seal. The gain-bore region within the cavity is narrowed and acts as the cavity aperture, increasing the available gain per unit length and relieving the fabrication tolerances.

14 Claims, 3 Drawing Sheets

INTERNAL ANODE SYSTEM FOR RING LASER GYROSCOPES

BACKGROUND OF THE INVENTION

1. Field of the Invention

This invention relates to electrical discharge systems for ring laser gyroscopes, and more particularly, internal anode systems for ring laser gyroscopes.

2. Description of Related Art

Over the past twenty five years the gaseous medium planar ring laser gyroscope has been developed and evolved as a reliable and relatively environmentally insensitive inertial rotation sensor. Planar ring laser gyroscopes of both triangular and square geometries have been used in inertial navigation systems and flight control systems regularly in both commercial and military aircraft. The primary advantage of the ring laser gyroscope over the spinning-wheel mechanical gyroscope is its ability to be configured into a truly strapdown system. This provides a system that not only has a much larger dynamic range than the mechanical equivalent but also one free of mechanical bearings, greatly enhancing its ability to withstand relatively large mechanical shock without permanent degradation of its performance. Because of this and other features the expected mean time between failures of most ring laser gyroscope inertial navigation systems is several times longer than the mechanical gyroscopes they replace.

Components affecting the operating life of a DC discharge ring laser gyroscope include the electrodes, such as the cathode and anodes and the method for sealing such electrodes to the ring laser gyroscope body. Prior art designs are exemplified in the following U.S. Pat. Nos.: 3,390,606, issued Jul. 2, 1968 to Podgorski; 4,273,282, issued Jun. 16, 1981 to Norvell et. al.; 4,392,229, issued Jul. 5, 1983 to Hostetler; 4,432,660 issued Feb. 21, 1984 to Norvell et.al.; and, 4,837,774 to Jabr et. al. The Norvell '229 and '660 patents are directed to better sealing techniques for external electrode discharge laser gyroscopes, while Podgorski '282 shows the use of an anode positioned within the laser cavity bore, but without particular emphasis or description. In particular Podgorski's patent discusses anodes which are "positioned within the triangular cavity" but does not describe how this is accomplished or how electrical contact is made to them through the glass frame. His drawings indicate that two electrical feedthroughs are required which would incorporate two extra seals on the triangular frame. Podgorski's discharge path fills a large fraction of the lasing-light path in order to provide the necessary gain for lasing action and as such requires a larger power consumption than would be necessary if the discharge path could be shortened.

FIG. is a PRIOR ART embodiment similar to the design described regarding FIG. 1 of U.S. Pat. No. 4,392,229 (heretofore cited). The ring laser gyroscope is shown in plan view in FIG. 1. A Ring Laser Gyroscope frame 10, made of a dimensionally stable material such as quartz or Zerodur TM, is shown generally rectangularly shaped to carry a ring laser cavity 12a through 12d. (It should be note that although the cavity 12a–12d is shown to be rectangular, it may be triangular or any other suitable polygonal shape.) The cavity 12a through 12d is filled with a laser gas such as, for example, a mixture of helium and isotopes of neon. The laser cavity 12 is shown as a planar cavity (but need not be restricted to planar configuration for all varieties of ring laser gyroscopes). Mirrors 14, 16, 18, and 20 are positioned at the vertices of the rectangular cavity 12a through 12d to create a resonant cavity. The gyroscope frame 10 defines mirror wells 14a, 16a, 18a and 20a to receive and house the mirrors 14, 16, 18, and 20. The mirrors 14, 16, 18, and 20 are angled to reflect counterpropagating laser light around the laser cavity path 12a–12d. One or more mirrors, such as 14 and 20, may be partly transmissive so that photosensors (not shown) affixed to the outer surface of the mirror substrate may sense counterpropagating light as a resonant beat signal which can be detected by appropriate electronics, yielding both rotation rate and direction or sense. The gas laser, in order to lase, requires the flow of a high voltage electrical discharge from the cathode 22 to each of the external anodes 24 and 26. Filled with a helium-neon laser gas, the active gain medium region 28 exhibits a glow discharge of orange light which, as indicated by the shaded cavity portions, extends from each of the anodes 24 and 26 to the cathode 22. The anodes 24 and 26 and the cathode 22 are hermetically sealed to the gyroscope frame 10; and, the external anodes 24 and 26 are positioned symmetrically about the cathode 22 to ensure diminished Langmuir gas flow effects. Both the cathode 22 and the anodes 24 and 26 are metallic (such as aluminum for the cathode and copper for the anodes), and the interior of the cathode 22 is preferably covered with a coating of an electron-emitting oxide (such as aluminum oxide). It can be seen that the active gain medium region 28 may extend any where from $\frac{1}{8}$ to $\frac{1}{2}$ of the entire length of the gyroscope cavity 12a through 12d. The PRIOR ART design contemplates an active gain medium region 28 path designed to avoid accidental backlighting between the anodes. Prior Art DC-discharge ring laser gyroscopes use anodes 24 and 26 that are mounted at separate access tubes in the gyroscope frame 10. This technique operates successfully but requires extra seals and a portion of the discharge is not used for gain.

DETAILED DESCRIPTION OF THE PREFERRED EMBODIMENT

Figure 1:
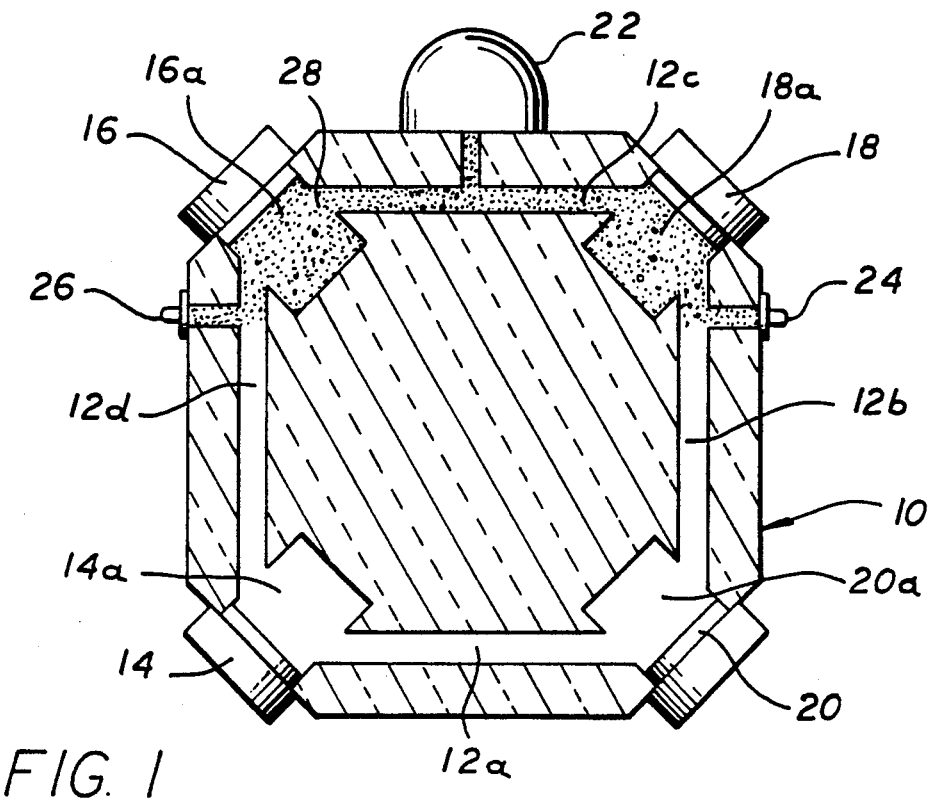
FIG. 1 is PRIOR ART drawing showing a ring laser gyroscope with an anode as used in the prior art.
Figure 2:
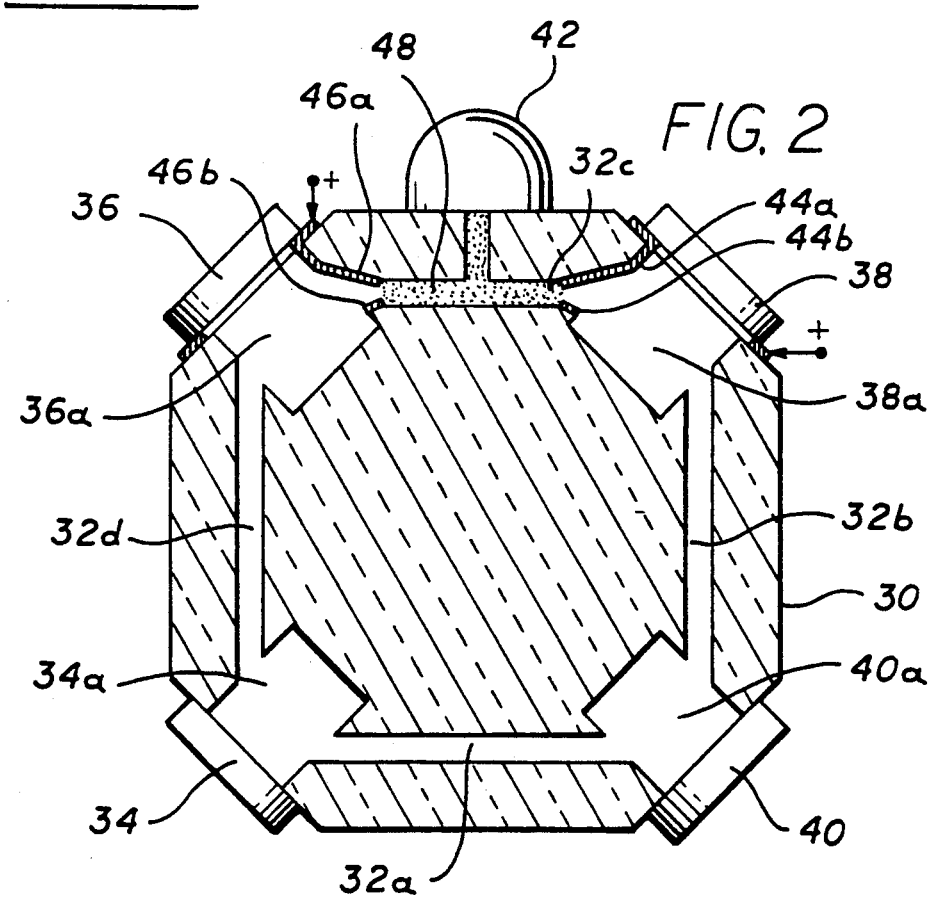
FIG. 2 is a cross sectional plan view of a typical square gyroscope embodying the anode of the present invention.
Figure 3:
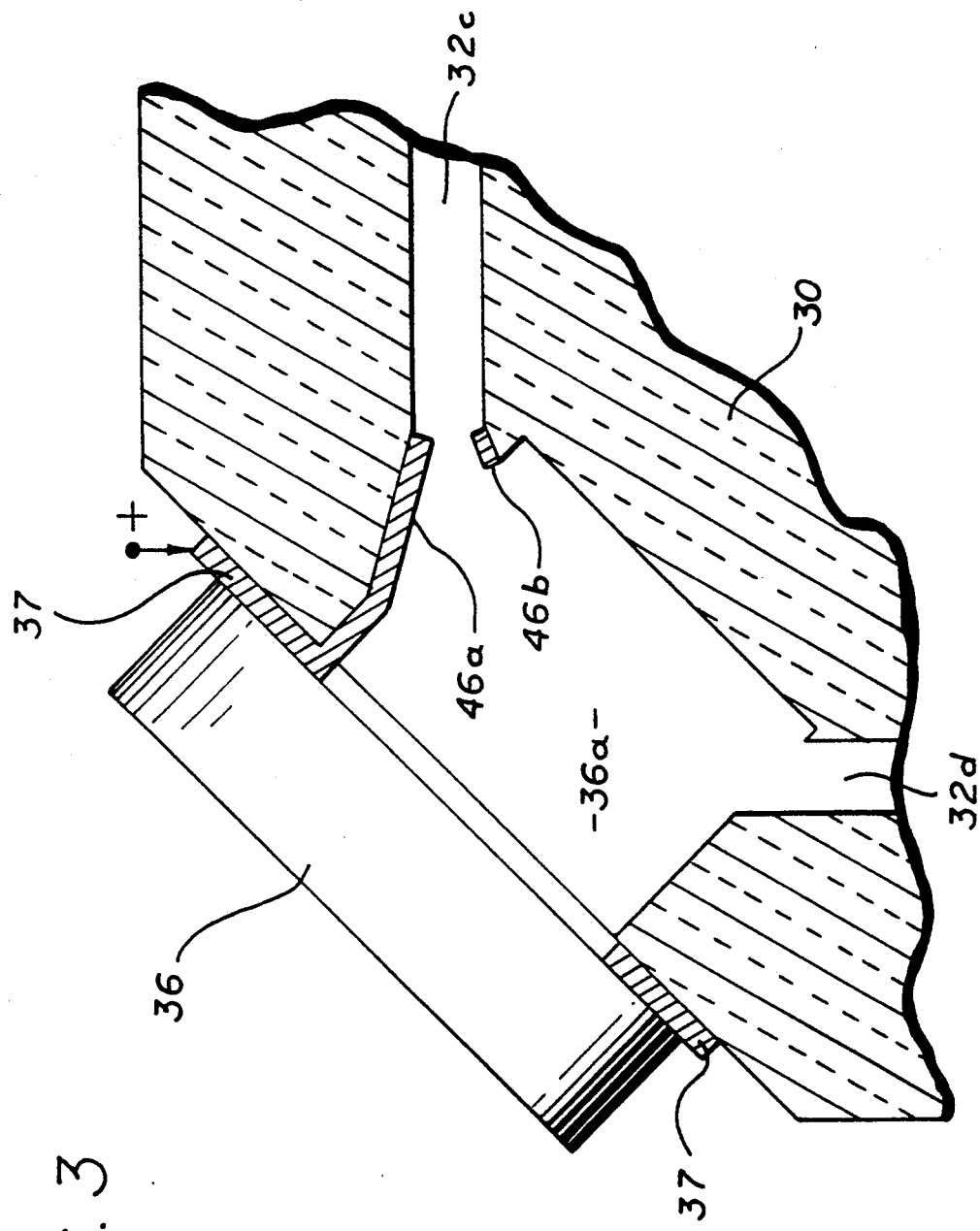
FIG. 3 is an enlarged view of the anode region 46a and 46b of FIG. 2 showing details of the anode of the present invention.
Figure 4:
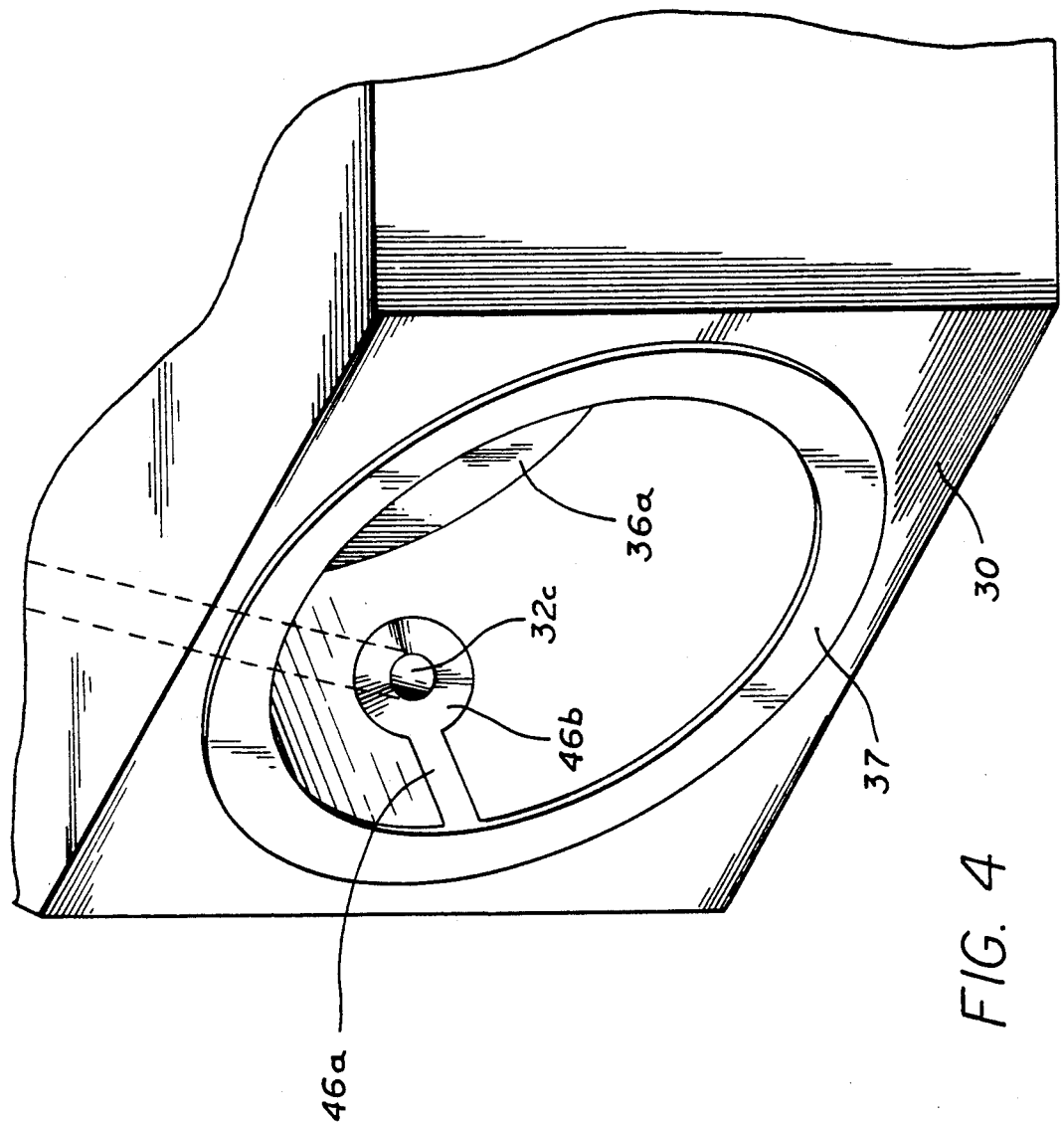
FIG. 4 is a view take along the gain bore 32c (where the mirror 36 is removed from the corner of the ring laser gyroscope) looking at the details of the anode 46a, 46b and mirror well 36a of FIGS. 2 and 3.

In contrast to the prior art configuration shown in FIG. 1, the applicant's design, shown in FIGS. 2, 3, and 4, achieves the necessary lasing of the gaseous medium in a substantially shorter discharge path through gain medium region 48. A ring laser gyroscope frame 30 has an internal laser cavity bores 32a–32d configured, in the preferred embodiment, in a rectangular shape, having four corner mirrors (and mirror supporting substrates) 34, 36, 38, and 40. (The internal laser cavity bores 32a-32d may also be called interconnecting conduits 32a-32d, any two of such conduits 32a-32d intersecting at their respective ends at one of the mirror wells 34a, 36a, 38a, and 40a.) Opposite each mirror and within the gyroscope frame 30 are mirror wells 34a, 36a, 38a, and 40a. These mirror wells, 34a, 36a, 38a, and 40a, may also be known as cavities; each one of such cavities being positioned at one of the intersections of the interconnecting conduits 32a-32d. An electrical discharge path is formed in the active gain medium region 48 and connects the internal anodes 44a,44b and 46a,46b with the cathode 42. A feature of the applicant's invention is the internal placement of the anodes 44a,44b and 46a,46b in the mirror wells (36a and 38a) of the gyroscope frame 30. Internal anodes 44a, 44b and 46a, 46b comprise a thin metal coating deposited on a generally outwardly tapering end portion of bore 32c. Another feature is the use of a narrow diameter gain bore 32c which also acts as an aperture within the laser light path by restricting the number of transverse modes lasing within the cavity. Conventional laser-gyro cavity designs use a wider gain-bore diameter to prevent vignetting of the beam and a separate aperture (formed by a very short segment of narrower bore) away from the gain medium. Since the gain provided by the neon discharge in the cavity is inversely proportional to the gain-bore diameter, the applicant's use of the gain bore (active medium region 48) as the aperture not only removes the aperture as an additional component from the cavity but also allows shortening of the gain region because of the larger gain per unit length available. A shortened gain bore provides a lower power consumption and easier discharge initiation characteristics. The mirrors 36 and 38 cover access to the laser cavity at the mirror wells 36a and 38a. The use of internal anodes 44 and 46 eliminate the need for two additional bores and the anode-to-frame seals, required when external anodes ( anodes 24 and 26) are affixed to the laser body 10 of Prior Art FIG. 1. As shown in FIGS. 2 through 4, certain of the wall surfaces of the mirror wells 36a and 38a, below the mirror, are coated at the location of anodes 44a and 46a with a suitable conducting material such as gold. Lead 46a comprising a narrow strip of conducting material is also deposited along the side of the well 36a (FIG. 4) to form an electrical contact between the electrical feedthrough 37 and the internal anode 46b. The surface on the frame 30 where the mirror 36 is attached is also coated (electrical feedthrough 37) and the mirror 36 is sealed onto this surface of the frame 30 by known techniques. A solder contact can then be made to the exterior coating of the feedthough 37 for providing power and electrical discharge to the anode 46. The strip of conductive coating 46a running down the side of the mirror well 36a can be overcoated with a non-conductive coating to avoid discharge emanating from this gain medium region 48 if proximity of the discharge to the mirrors causes unwanted damage to the dielectric coatings. In the experience of the applicant, careful consideration of the width and thickness of the coated layers 46a preclude the presence of a plasma in the mirror well region 36a. This internal type of anode, 46a and 46b, has the advantage that no additional hole or seal is needed, and the mirror 36 itself covers the hole. In addition, essentially all the discharge so created is in the light path and so acts as gain medium 48 thus making most efficient use of the power used to create the discharge and thereby lowing the necessary power consumption of the gyro. Any potentially higher cost involved with applying the coating, may well be more than offset by the savings involved in not needing an additional seal for each anode, since the anodes are internal and on the cavity bore 32c and do not require to be affixed and sealed to the gyroscope frame 30, as is required of the external anodes 24 and 26 of the PRIOR ART design. The applicant has conducted test runs. The test runs of the internal anode design have shown no significant problems and the first test frames have acquired over a year of run time without any apparent damage to the mirror coatings near the internal anodes. The applicant has observed that the internal anode design of FIGS. 2, 3, and 4, with a narrowed gain region acting a cavity aperture, allows a very short gain region and apparently produces more gain than is predicted from the conventional inverse exponential dependence of gain on bore diameter, possibly because of lower super-radiance effects from the $3.39\mu$ line in neon which competes with the $0.632\mu$ red line used in ring laser gyros. One may also note that there appears to be a much larger range of plasma currents for which there are no oscillations when the internal anodes 44a,44b and 46a,46b are used.

It may additionally be noted that the positioning of anodes 44b and 46b is in a generally conical shape at the intersection of orthogonal cavities such as 32d and 32c at mirror well 36a. The conical shape of the openings upon which anodes 44b and 46b are coated is a more optimal configuration for manufacture of the internal anodes 44a,44b and 46a,46b. Generally, the conductive coating used to form the anodes 44a,44b and 46a,46b and their respective electrical feedthroughs (such as feedthrough 37 for anode 46) may be an amalgam of nickel, copper, and gold. The conductive coating (forming the leads 44a and 44b and feedthrough 37) may be overcoated with a cement, such as Silvac, to prevent the laser discharge from traveling up the conductive coating causing degradation of the laser action; this overcoating is not a requirement for successful ring laser gyroscope operation, since such laser discharging along the conductive feedthrough 37 has not been experimentally observed. As can be seen by observing FIG. 4, the electrical coating extends from the anode 46a and along the lead 46b to electrical feedthrough 37 and on out to the sealing rim of the mirror substrate 36. During manufacture, after coating the conical surface of the bore 32c at 46b, the opening of the mirror well 36a is sealed hermetically using epoxy to affix the mirror substrate 36 to feedthrough 37 disposed at the open end of the mirror well 36a.

The internal anode of the present design may reduce spurious oscillations which may occur over a frequency range from 10 KHz up through 100 KHz in certain ring laser gyroscopes. Another advantage of the internal anode design is the reduction in thermal gradients occurring across the cathode and anodes. The internal anode design of this invention improves thermal contact with the gas, allowing less thermally-induced drift and reduced Fresnel-Fizeau induced gas flow effects. There is a reduced chance for a thermal gradient between the anodes due to the shortness of the discharge path between them.

As described above, the laser cavity bore 32c, which houses the internal anodes 44a, 44b and 46a, 46b (FIG. 2) may be designed with a narrower cross-sectional diameter, so that this leg 32c may also serve as an aperture, suppressing unwanted off-axis transverse modes. In this manner, the need to machine a small constriction in a particular leg of the laser cavity 32 is eliminated. It will be noted that using laser cavity leg 32c, situated in the active medium region 48, as an aperture is against the teachings of the prior art, which usually taught to place the aperture outside the active gain region. In the prior art, this advise was good, since a constriction in the active medium region 28 (of FIG. 1) might give rise to unwanted backlighting of the laser along an undesirable path, such as having discharge travel from the anode 26 to the cathode 22 by way of anode 24. Due to the shortness of the electrical discharge path through region 48 of FIG. 2, the fact that leg 32c is constricted relative to the remaining legs (32a, 32b, and 32d) of the cavity 32 would not be one that would give rise to backlighting, as might be the case in the prior art if the aperture were to be located in the active medium. Another advantage of the applicant's combination of the gain bore and the aperture is that the configuration guarantees that the optical axis for the light path will be coincident with the center of the gain bore where there is maximum gain. This eliminates the need to control tolerances during fabrication that are normally required to align the gain bore and a separate aperture elsewhere in the cavity and provides a gyro that is less susceptible to unwanted bias errors related to asymmetric gain-aperturing effects. A close proximity of positioning of the internal anodes 44a,44b and 46a,46b is allowed due to the more intense gain medium region created by the narrowing of the aperture/cavity leg 32c between the anodes 44a,44b and 46a,46b.

As with the prior art, it is desirable that the cathode 42 be placed approximately equidistant between the anodes 44a,44b and 46a,46b in order to minimize Fresnel drag effects in the bias.

While preferred embodiments are shown, it is clear that alternative equivalent embodiments of the invention may be envisioned which provide adequate alternatives, performing similar functions to the preferred embodiment, yet using the basic teachings and principles of the herein described invention. For example, the use of the internal anode system of this invention may be made in conjunction with any polygonal configuration of the ring laser gyroscope, such as a triangular or pentagonal-shaped ring laser gyroscope. Also, while the electrical coating materials taught are preferred, other conductive material or alloys may provide a working internal anode discharge system with varying degrees of successful operation. Additionally, while a conical open end to bore leg 32c is taught and shown in FIGS. 2-4, the coating surface for locating the internal anode is not limited to this shape or location. Thus, alternate embodiments having substantially equivalent functions or structures are intended to be comprehended within the scope of the appended claims.

What is claimed is:
1. A gas discharge device, comprising:
a) a monolithic block of dielectric material containing a passageway which can be filled with a discharge forming gas, said block having a mounting surface on an outer portion thereof, said block further having a cavity positioned to form a first intersection with said mounting surface and a second intersection with said passageway;
b) said passageway having a surface portion at said second intersection facing outwardly toward said mounting surface;
c) an internal electrode including a conductive coating on said surface portion of said passageway, a portion of said coating extending outwardly along the wall of said cavity and conductively connected to another portion of said conductive coating disposed on said mounting surface; and,
d) a plug of dielectric material affixed to said mounting surface and in contact with said another portion of said coating to form an enclosed cavity.

2. The gas discharge device of claim 1, wherein: the plug of dielectric material is affixed against said another portion of said coating, whereby, the plug forms a hermetically sealed closure for the cavity.

3. The gas discharge device of claim 1, wherein: a portion of said coating extends around the inner periphery of said mounting surface on said block.

4. The gas discharge device of claim 3, wherein: said coating extends beyond said plug, so as to enable an external electrical connection to be made to said conductive coating.

5. The gas discharge device of claim 1, wherein:
said internal electrode is at least a pair of anodes; and,
a cathode is mounted on said block of dielectric material in communication with said passageway to complete the discharge pathway between said cathode and each of said anodes.

6. The gas discharge device of claim 5, wherein:
the distance of the discharge path between said anode and cathode is relatively short, in the range of 0.25-2 centimeters.

7. The gas discharge device of claim 1, wherein:
the surface portion is an outwardly tapering region.

8. A ring laser gyroscope comprising:
a. a monolithic block having plurality of interconnecting conduits, at least three of said interconnecting conduits forming a ring optical pathway capable of containing a lasing gas and at least two of said interconnecting conduits having a common intersection;
b. a plurality of cavities in said block, one of each of said cavities positioned at each of two of said at least three of said interconnecting conduits, one of such cavity being located where said at least two of said interconnecting conduits have a common intersection; said one cavity having its sides in communication with said common intersection of said at least two of said interconnecting conduits and an opening in communication with an outer mounting surface of said block;
c. a plurality of mirrors positioned at each intersection of said conduits so as to define a closed laser beam path, each of said mirror positioned at each intersection of said conduits closing off and sealing said outer mounting surface of said block and mounted on a mounting surface of said block, forming a gas tight seal over said opening of said cavity; and,
d. an electrically conductive layer forming at least one internal anode, said at least one internal anodes so formed being positioned at the end of a preselected conduit of said interconnecting conduits;
said layer forming said internal anode being connected to a conductive strip running along one side of the cavity that is connected to the end of said preselected conduit;
at least one of said plurality of mirrors positioned at the opening of said cavity that is connected to the end of said preselected conduit;
said conductive strip being connected to a second layer, and which second layer extends under the periphery of said at least one mirror, said second layer circumscribing the periphery of said mirror, a portion of said layer extending beyond said mirror so as to enable connection of said internal anode to an external voltage.

9. The ring laser gyroscope of claim 8, including:

a cathode mounted on said block in communication with said conduits, whereby a discharge path is formed through said lasing gas between said cathode and said at least one anode.

10. The ring laser gyroscope of claim 8, wherein:

one of said interconnecting conduits containing an active gain medium;

said active gain containing conduit being a narrower diameter than any other interconnecting conduit forming the ring laser;

said active gain containing conduit operating as an aperture for suppressing at least one selected transverse mode of laser light in said ring laser gyroscope.

11. The ring laser gyroscope of claim 8, wherein:

one of said interconnecting conduits containing an active gain medium, said conduit being bounded by at least two internal anodes formed at either end of one of said interconnecting conduits;

said active gain containing conduit being a narrower diameter than any other interconnecting conduit forming the ring laser;

said active gain containing conduit operating as an aperture for suppressing unwanted transverse modes of laser light in said ring laser gyroscope; and, said at least two internal anodes being separated by a relatively short distance and positioned relatively in close proximity to one another.

12. The ring laser gyroscope of claim 8, wherein:

said electrically conductive layer is formed by a coating; and, said coating forming said at least one internal anode, said conductive strip, and said second layer circumscribing the periphery of said mirror.

13. The ring laser gyroscope of claim 12, wherein:

one of said interconnecting conduits containing an active gain medium, said conduit being bounded by at least two internal anodes formed at either end of one of said interconnecting conduits;

said active gain containing conduit being a narrower diameter than any other interconnecting conduit forming the ring laser;

said active gain containing conduit operating as an aperture for suppressing unwanted transverse modes of laser light in said ring laser gyroscope; and, said at least two internal anodes being separated by a relatively short distance and positioned relatively in close proximity to one another.

14. A method for making a ring laser gyroscope having at least one internal anode comprising:

forming a block of dielectric material, having a plurality of interconnected conduits capable of containing gas discharge;

forming within said block, at least one cavity having an inner portion intersecting a pair of said conduits;

said cavity having an outer portion open to a mirror-mounting surface of said block, said outer portion of said cavity having a continuous surface about its circumference, said continuous surface communicating with said mirror-mounting surface of said block, and extending inward from said mirror-mounting surface to said inner portion of said cavity;

coating a conductive material on a portion of said continuous surface of said cavity, said conductive material forming an electrically conductive strip;

coating an annular region of said conductive material on said mirror-mounting surface of said block of dielectric material;

coating a region of said inner portion of said cavity where said inner portion of said cavity intersects the end of one of a pair of conduits, forming an internal anode which communicates with said conduits capable of containing gas discharge;

said conductive strip of conductive material connecting said annular region and said coated region of said inner portion of said cavity;

affixing a dielectric member onto said coating on said mirror-mounting surface to form a cover over said cavity;

mounting a cathode on said block of dielectric material in communication with said conduits.

* * * * *